Figure 1:
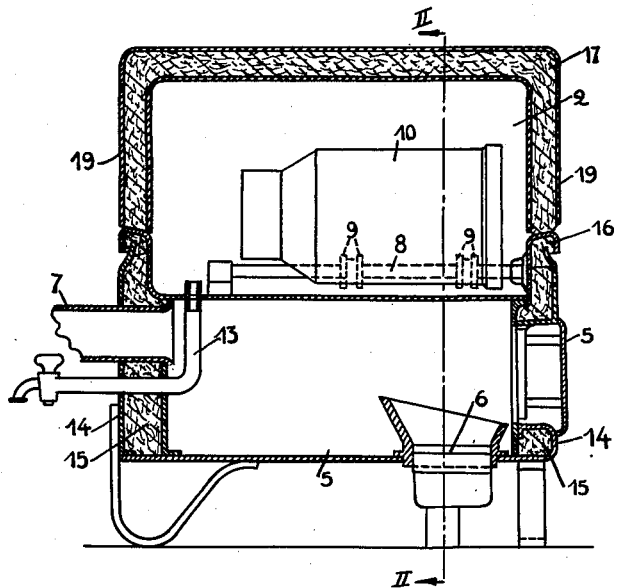

Nov. 25, 1952     F. J. J. HENRARD     2,619,025

APPARATUS FOR IMPROVING MILK PRODUCTS ON THE FARM

Filed July 16, 1947     2 SHEETS—SHEET 1

Inventor:
F. J. J. Henrard

Nov. 25, 1952   F. J. J. HENRARD   2,619,025
APPARATUS FOR IMPROVING MILK PRODUCTS ON THE FARM
Filed July 16, 1947   2 SHEETS—SHEET 2
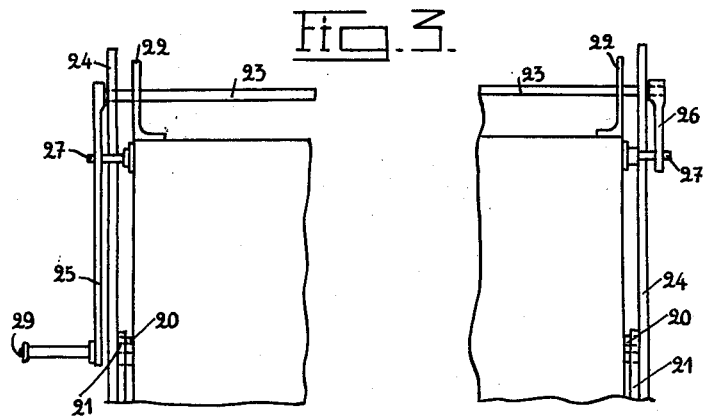
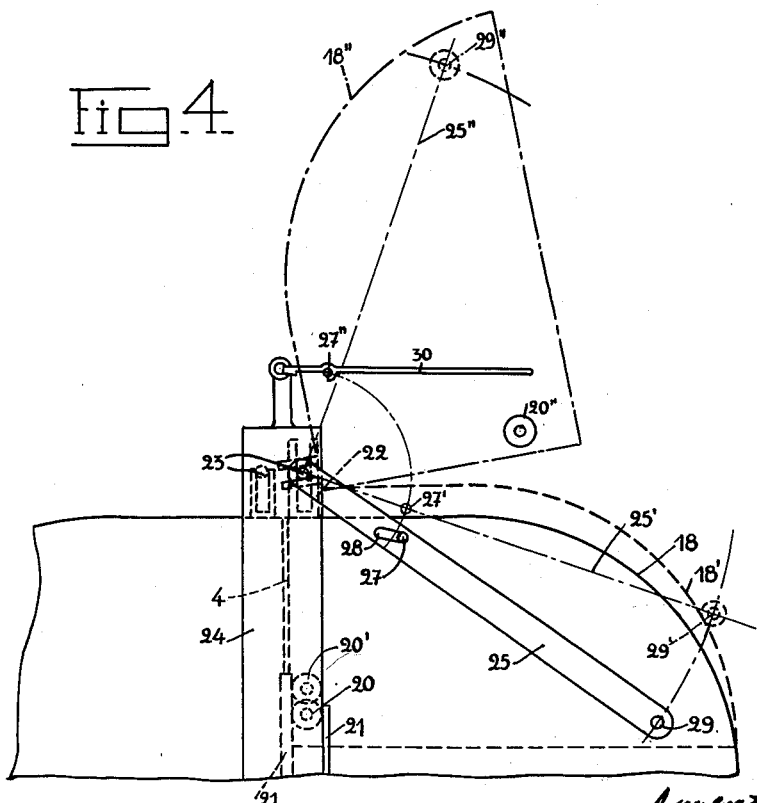

Patented Nov. 25, 1952

2,619,025

UNITED STATES PATENT OFFICE 2,619,025

APPARATUS FOR IMPROVING MILK PRODUCTS ON THE FARM

Fernand Jean Joseph Henrard, Brussels, Belgium, assignor to Ecremeuses Melotte, Societe Anonyme, Remicourt, Belgium Application July 16, 1947, Serial No. 761,377
In Belgium January 5, 1945

Section 1, Public Law 690, August 8, 1946
Patent expires January 5, 1965

3 Claims. (Cl. 99—371)

The present invention aims at allowing farmers to obtain milk products, which as far as quality and keeping are concerned, are at least comparable to those obtained in industrial dairies.

At the present time, industrial dairies obtain better milk products than the farm in spite of the unfavourable conditions under which the milk may be brought to them because they have at their disposal a steam boiler, sterilizers for the plant which comes into contact with the milk, refrigerators, generally of the type in which the milk or cream spreads out in a thin layer exposed to the contact of the air, and of pasteurizers connected to each other by pipes in which the milk or the cream circulates out of contact with the air which is the chief carrier of microbes and ferments which are harmful to milk products.

This plant constitutes an installation which is too expensive for its use to be envisaged in a farm, even a very important one. An installation of the same type, but having a capacity adapted to the milk production of the farm, cannot be envisaged either because it would necessitate nevertheless a special appropriate building and the cleaning and the sterilization of this plane and of its connecting pipes would necessitate special care requiring an abnormal length of time for a farming establishment.

The present invention has as its object an apparatus for treatment of milk and cream which allows the cooling and pasteurization of these products to be effected while maintaining them out of contact with the air without passing them through pipes from a surface refrigerator to a pasteurizer heated by means of steam coming from a boiler.

In the apparatus according to the invention, the milk products are subjected to rapid cooling and to pasteurization in hermetically closed churns in which they have been collected after having been sterilized.

In other words, it suffices to sterilize churns having an airtight closure, for example, by means of boiling water and steam, before using them for collecting the milk or cream, to close them when they contain these products, to cool them rapidly or to subject them for the required length of time to the pasteurizing temperature.

By the airtight closing of the sterilized churns, immediately after the milk or cream has been collected, any contact of these products with the air is avoided and a special building in which hygienic measures would have to be taken can be dispensed with. By the cooling or the pasteurization of these products without having to open the churns, the transfers which are necessary in any other method are avoided even if pipes are used for the circulation of the products between the different devices. At the same time, as the preliminary sterilization of the churns is effected, that of the other utensils such as buckets, pails, reservoirs, bowls and accessories of the separator which are to come into contact with the milk can be effected.

The vat of boiling water serving for the sterilization of the empty churns, can, moreover, be utilized for the pasteurization of the products contained in the sterilized churns.

The invention has also as an object a particularly simple apparatus allowing the method of the invention to be carried very simply into effect. The apparatus in accordance with the invention comprises means allowing at least one churn covered externally with a layer of water at the required temperature and which leaves the churn at its lower part to be rotated about its longitudinal axis which is orientated in a direction other than the vertical direction and preferably in the horizontal direction.

The rotation of the churns in the manner which has just been indicated accelerates the heat exchange and consequently shortens the sterilization, the refrigeration, and the pasteurization periods.

In an alternative arrangement, the churn is supported at such a level that it dips partly into the water contained in a vat.

In another alternative arrangement, the apparatus comprises a device for spraying the churn.

In one advantageous embodiment, the above-mentioned driving means for the churn comprise rollers having a horizontal axis on which cylindrical churns can be loaded and of which at least one per churn is rotated.

These rollers are preferably each provided with rubber bands which prevent jumping of the churn during its movement of rotation and which allow the effects due to hollows and dents which are so frequently apparent in the body of the churn to be avoided. Furthermore, these rubber bands deaden the shocks when the churns are put in place and help in the driving of the churns.

When the apparatus is used as a cooler, the film of water which adheres to the part of the churn which dips into the water, spreads on the surface of the layer of water in the vat. For the purpose of maintaining the temperature of the cooling water as low as possible, provision is made for eliminating the heated surface water through an overflow while cold water is brought in a continuous manner preferably by means of a pipe opening into the bottom of the vat.

For the same purpose, the volume of water contained in the vat is reduced as much as possible in order that the added cold water may easily maintain the water in the vat at a temperature very near its own.

When the apparatus is to be used for pasteurization, the water in the vat can be brought to boiling point by any suitable source of heat.

Other features and details of the invention will appear in the course of the description of the drawings accompanying the present specification which represent diagrammatically, and merely by way of example, two embodiments of a device in accordance with the invention.

Figure 2:
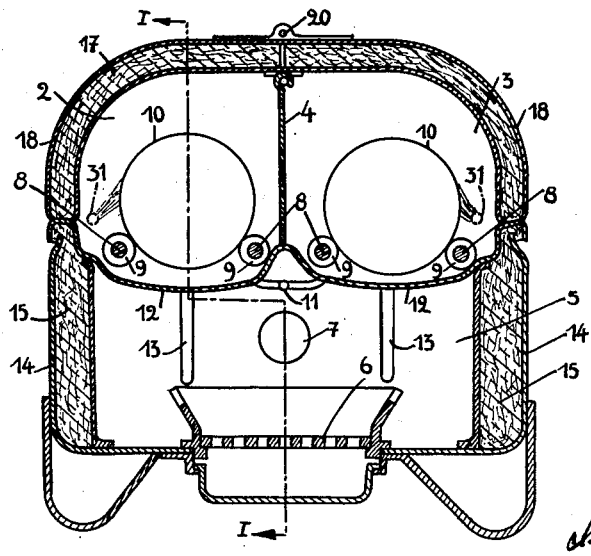

Figure 1 is a longitudinal vertical section on a plane represented by the line I—I in Figure 2, Figure 2 is a cross-section on a plan represented by the line II—II in Figure 1, Figures 3 and 4 are respectively front and side views of the upper part of the apparatus in accordance with the invention.

In these various figures, the same references designate identical elements.

These figures shown an apparatus comprising a vat divided up into two compartments 2 and 3 by a removable partition 4. Below this vat, there is a furnace 5 comprising, for example, a grate 6 and a flue 7. In each of the compartments 2 and 3 of the vat, there are rollers 8 having horizontal axes which are provided with rubber bands 9. Cylindrical churns 10 can be placed on these. One of the rollers 8 contained in each compartment of the vat can be rotated so that the churn which rests on the bands 9 is rotated about a horizontal axis.

Water can be introduced into the bottom of each compartment through the pipe 11 opening out into the bottom 12 of the vat. The speed of rotation of the churn is determined as a function of the transmission of heat between the water and the milk or cream through the metal wall of the churn. An overflow pipe 13 is so arranged relatively to the base of the vat that the thickness of the layer of water on this base is small. The part of this tube which is above the base 2 is removable so that by its removal the pipe 13 is transformed into a drain pipe. The rollers 8 and the bands 9 must of course be at such a level that the churn 10 which they support dips partially into the water when the above-mentioned removable member is in place on the pipe 13. The base 12 is concave upwards so that it is approximately parallel to the churn carried by the rollers. By means of this feature, the volume of water in each compartment is relatively small.

The outside walls 14 and 16 of the vat are provided with a layer of heat insulating material designated respectively by 15 and 17. Each of the compartments 2 and 3 containing a churn is provided with a cover extending over approximately the whole height of the vat on the side 18 where the person who lifts the cover is placed. In other words, the cover extends substantially below the upper level of the vat. The same applies to the two side plates 19. Each of the covers can be lifted independently of the other by being swung about a pin represented diagrammatically at 20 in Figure 2.

In practice, it is of advantage to mount each cover in the manner shown in Figures 3 and 4 so that the person who lifts the cover is not incommoded by the steam when the cover starts to be lifted.

The two lateral plates 19 of the cover each carry a roller 20 which, when the cover closes the vat is engaged between two vertical walls 21 which serve as a guide for it. The cover 18 has near each side plate 19, a fork 22 embracing a shaft 23 which rotates in two supports 24 fixed to the walls of the vat 14 on the side of the latter remote from that where stands the person who lifts the cover.

At each end of this shaft is keyed a lever designated 25 and 26. Each lever makes contacts with the cover through a rod 27 fixed to the cover and sliding in a groove in the levers under consideration. The groove formed in the lever 25 is designated 28 in Figure 4.

With this method of assembly, if, by acting on a handle 29 of the lever 25, this lever is caused to pass from the position shown in full lines to that shown diagrammatically by the line 25', the cover can be displaced only vertically because the rollers 20 are guided vertically as far as 20' and forks 22 slide vertically relatively to the shaft 23 while the rods 27 move in the groove 28 of the levers 25 and 26. The cover then occupies a position such as that shown in dotted lines at 18' and the steam from the vat can escape along the upper edge of the wall 4.

When the lever 25 is passed from the position 25' to that designated 25'', the cover passes from the position shown in dotted lines 18', to that shown in chain dotted lines 18'', its forks 22 turning about the shaft 23. The roller 20 then takes up the position 20''. The cover can be maintained in this last position by a locking device 30 cooperating for example with the rod 27 occupying the position designated 27''. A counterweight can play the same part.

Wetting of the outside of the rotating churn can be effected otherwise than in the manner described above. For example, a spraying device can be provided such as that shown in chain-dotted lines in Figure 2 and which comprises a perforated tube 31 disposed preferably near the bottom of the churn 10. The perforations in this tube are formed in such a way that the jets of water which emerge from them are directed in the sense of rotation of the churn. In that case, the pipe 11 is not used.

When a device in accordance with the invention is available, milk products can easily be obtained, the quality and good keeping powers of which can often rival those of industrial dairies. Indeed, the same operations as are carried out in industrial dairies can be carried out without trouble and with a single apparatus namely: sterilization of the churns and of the other utensils which are to come into contact with the milk or cream and pasteurization of the milk or cream.

The washing and the drying of the churns before sterilization are likewise made very easy by the use of the apparatus in accordance with the invention.

Indeed, after the usual washing and rinsing of the churns, they can, in order to be dried, be introduced into apparatus with their cover removed or half open, so as to be brought to the boiling temperature of water, which takes place in a very short time. As soon as this temperature is reached, the churn is removed from the apparatus and the little water which still moistens the inside of the churn is instantaneously evaporated because of the quantity of heat stored by the mass of the churn. After evaporation of this water, the cover is replaced on the churn so as to close it hermetically.

To sterilize the dry and hermetically closed churn, it is replaced in the apparatus and it is caused to rotate for two or three minutes in boiling water and its steam. At the end of this time, the churns and the air which they contain reach the sterilizating temperature. The churn is then removed from the apparatus and can, at this stage, await the moment at which it will be used. The air inside them being sterile and the churns being hermetically closed, microbic contamination from the external air is no longer possible.

The churns sterilized in this way are used for collecting either milk or cream. After being filled with milk or cream, the churn is closed by means of its air-tight cover and it is placed in the apparatus to be rapidly cooled by a current of cold water, for example, water coming from a well. It is known that, to be effective, the cooling of milk or cream must be as rapid as possible and must be effected out of contact with the air.

The rapid cooling is obtained as a result of the rotation of the churn which is partly in the cold water and to the rapid and continuous elimination of the heated water. Indeed, when the part of the churn which is in the water comes out of the water, a thin layer of water adheres to it and turns with it. This layer of water in contact with the churn heats up during the rotation of the churn until it comes into contact again with the cooling water. At this instant, the thin layer of water which adhered to the churn separates from it because of the difference between its density and that of the cold water contained in the vat.

The hot water which gathers on the surface of the layer of water in the vat is evacuated through the overflow pipe 13 while the fresh cooling water is added at the bottom of the vat. As the latter only contains a small quantity of water, the addition of the fresh water can maintain the water in the vat at a temperature very near that of the water in the feed pipe.

The liquid inside the churn also adheres to the inner surface of the latter and, therefore, the cooling water outside and the liquid to be cooled inside are retained on either side of the wall of the churn, through which they rapidly exchange their heat.

The speed of rotation of the churn is such that the liquid mass contained in this churn does not turn with it.

This manner of operation has the effect of causing the liquid mass which is to be cooled to be spread out in a thin layer out of contact with air which may be contaminated.

To sum up, the rapid cooling of the milk or cream is characterized by the rotation of the churn which allows the hot and cold thin layers on either side of the wall of the churn to be continuously renewed and by the rapid evacuation of the hot water, this evacuation allowing the constant utilization of a cooling water which ensures the maximum difference of temperature with the liquid to be cooled.

For pasteurizing the milk or cream, the water contained in the vat is heated to boiling point. The rotation of the churn filled with milk or cream has the effect of bringing the liquid to be pasteurized rapidly to a temperature allowing of the destruction of ferments and micro-organisms because the heat exchange from outside to inside is carried out under conditions similar to those described for the cooling.

The most common method used for pasteurization consists in heating the milk or cream to a temperature of about 65° C. and in maintaining this temperature during 20 to 30 minutes.

In order to increase the production of the apparatus without in any way changing the length of the pasteurization periods, the churn can be removed from the apparatus as soon as the temperature of the liquid inside it is reached and can be placed under a heat-insulated bell forming part of the accessories which are delivered with the apparatus. This churn is then allowed to remain in the bell for a length of time sufficiently great to enable perfect pasteurization to be effected.

When the pasteurization is completed, use can be made of the heat contained in the water in the vat to sterilize immediately the various utensils used in farms for the treatment of milk.

The parts of the separator such as the bowl, the reservoir and other accessories which come into contact with the milk as well as the milking pails and the milking pots of the milking machines should be sterilized before use. Their sterilization can follow that of the churns in order to make the work more easy and can thus be effected last of all. With this object, these utensils are placed in the apparatus in which the water is still boiling and they remain there in a steam bath or in direct contact with the boiling water in the vat. After a few minutes, the vat is emptied of its water by removal of the upper removable part of the pipe 13 and the utensils are left in the apparatus which is maintained closed until they are about to be used.

The hot water which is drained off can be used for any other farm use.

The sterilization of the churns and other utensils can be effected at the time which is most convenient for the use of the apparatus as the churns remain hermetically closed after their sterilization and the other utensils remain in the closed apparatus which is itself, of necessity, also sterilized.

It is clear that the invention is not exclusively limited to the embodiments shown and that many modifications can be made to the shape, the disposition and the constitution of certain of the elements used in carrying it into effect on condition that these modifications are not in contradiction with the object of each of the following claims.

It is, for example, obvious that the furnace can be a wood, coal, gas or liquid fuel furnace. Electric heating can also be used. In the latter case, the heating resistances can be placed beneath the vat but they will preferably be disposed so as to be immersed in the liquid at the bottom of the vat.

What I claim is:

1. An apparatus for thermally treating liquid milk products comprising a vat provided with supporting means supporting a longitudinally disposed milk container therein, said vat constructed of a front wall, rear wall and two lateral walls in which the upper edge of the front and lateral walls extends higher than the level of said supporting means and wherein the rear wall is higher than the level of said supporting means, rotating means connected to said supporting means for the rotation of said supporting means, a cover for said vat provided with a roller on each side thereof, fixed vertical guides for the rollers to guide the cover in closed position, a shaft having an axis fixed relative to said rear wall and above said rear wall, a fork attached to said cover through which said shaft passes, said fork extending under said shaft a distance equal to the penetration of said rollers in their vertical guides when the cover is closed, pivoting lever means mounted on each side of said cover on said shaft, and a groove and rod connecting means to connect the oppositely placed lever means and said cover for suspending the cover from said lever means, the groove adapted to engage the rod in said groove and rod means when the lever means pivots upwardly and the cover is guided in said vertical guides.

2. An externally heated apparatus for thermally treating liquid milk products comprising a vat provided with supporting means to support a longitudinally disposed milk container therein, said vat constructed of a front wall, rear wall and two lateral walls in which the upper edge of the front and lateral walls extends higher than the level of said supporting means and wherein the rear wall is higher than the level of said supporting means, rotating means connected to said supporting means for the rotation of said supporting means, a cover for said vat provided with a roller on each side thereof, fixed vertical guides for the rollers to guide the cover in closed position, a shaft having an axis fixed relative to said rear wall and above said rear wall, a fork attached to said cover through which said shaft passes, said fork extending under said shaft a distance equal to the penetration of said rollers in their vertical guides when the cover is closed, pivoting lever means mounted on each side of said cover on said shaft, and a groove and rod connecting means to connect the oppositely placed lever means and said cover for suspending the cover from said lever means, the groove adapted to engage the rod in said groove and rod means when the lever means pivots upwardly and the cover is guided in said vertical guides.

3. An apparatus for thermally treating liquid milk products comprising a vat, a closed metal milk container in said vat, said milk container having its longitudinal axis in the horizontal direction relative to said vat, supporting means supporting said container in said vat, rotating means connected to said supporting means for the rotation of said supporting means and said can, spraying means for applying cooling water to the outside of said can in said vat, heating means to heat said vat, said vat constructed of a front wall, rear wall and two lateral walls in which the upper edge of the front and lateral walls extends a little higher than the level of said supporting means and wherein the rear wall is higher than the level of the front and side walls, a cover to close said vat, a roller on each side of said cover, fixed vertical guides for each of said rollers to guide the cover in closed position, a shaft above said rear wall, said shaft having an axis fixed relative to said rear wall, a fork attached to said cover through which said shaft passes, said fork extending under said shaft a distance equal to the penetration of said rollers in their vertical guides when the cover is in closed position, two pivoting levers mounted on said shaft, one on each side of said cover, and a groove and rod connection between each of said levers and said cover to suspend said cover from each of said levers, said groove adapted to engage the corresponding rod when the lever is pivoted upwardly and during the time that the cover is guided in said vertical guides.

FERNAND JEAN JOSEPH HENRARD.

REFERENCES CITED

The following references are of record in the file of this patent:

UNITED STATES PATENTS

| Number | Name | Date |
|---|---|---|
| 531,479 | Stickney | Dec. 5, 1894 |
| 829,212 | Hughes | Aug. 21, 1906 |
| 913,600 | Willmann | Feb. 23, 1909 |
| 1,093,924 | Fischer | Apr. 21, 1914 |
| 1,212,483 | Heller | Jan. 16, 1917 |
| 1,631,999 | Chandler | June 14, 1927 |
| 1,693,034 | Jeusen | Nov. 27, 1928 |
| 1,851,820 | Dunbar | Mar. 29, 1932 |
| 2,119,346 | Page et al. | May 31, 1938 |
| 2,241,930 | Pike | May 13, 1941 |
| 2,284,269 | Eberts | May 26, 1942 |
| 2,348,440 | Smith et al. | May 9, 1944 |
| 2,415,782 | Zademach et al. | Feb. 11, 1947 |
| 2,502,685 | Warner | Apr. 5, 1950 |